(12) United States Patent
Pasqua

(10) Patent No.: US 10,814,934 B2
(45) Date of Patent: Oct. 27, 2020

(54) REAR DERAILLEUR OF A BICYCLE

(71) Applicant: CAMPAGNOLO S.r.l., Vicenza (IT)

(72) Inventor: Paolo Pasqua, Camisano Vicentino (IT)

(73) Assignee: CAMPAGNOLO S.r.l., Vicenza (IT)

(*) Notice: Subject to any disclaimer, the term of this patent is extended or adjusted under 35 U.S.C. 154(b) by 405 days.

(21) Appl. No.: 15/846,667

(22) Filed: Dec. 19, 2017

(65) Prior Publication Data

US 2018/0170481 A1    Jun. 21, 2018

(30) Foreign Application Priority Data

Dec. 20, 2016  (IT) .................. 102016000128989

(51) Int. Cl.
*B62M 9/1242* (2010.01)
*B62M 9/1248* (2010.01)
(Continued)

(52) U.S. Cl.
CPC .......... *B62M 9/1242* (2013.01); *B62M 9/121* (2013.01); *B62M 9/125* (2013.01);
(Continued)

(58) Field of Classification Search
CPC .... B62M 9/121; B62M 9/124; B62M 9/1242; B62M 9/1244; B62M 9/1246; B62M 9/1248; B62M 9/125; B62M 9/126
(Continued)

(56) References Cited

U.S. PATENT DOCUMENTS 4,850,940 A     7/1989  Nagano
5,836,844 A  *  11/1998  Yoshida .................. B62M 9/125
                                                        474/80
(Continued)

FOREIGN PATENT DOCUMENTS

CN    1075011 C    11/2001
EP    0075927 A2    4/1983
(Continued)

OTHER PUBLICATIONS

Italian Search Report and Written Opinion in Italian Application No. 102016000128989, dated Sep. 27, 2017, with English translation.
(Continued)

*Primary Examiner* — Michael R Mansen
*Assistant Examiner* — Raveen J Dias
(74) *Attorney, Agent, or Firm* — Volpe Koenig

(57) ABSTRACT

A rear derailleur of a bicycle is disclosed. The rear derailleur includes a four-bar linkage. A fixing pin is received in a blind inner cavity of a base body and a fixing screw is constrained to a frame. A spring loading insert is arranged in the blind inner cavity. The base body is rotatable with respect to the spring loading insert. Connection members are inserted in seats formed on the fixing screw and on the spring loading insert to axially constrain the fixing screw and the spring loading insert. A toothed sector is mounted coaxially to the spring loading insert and is active on a sprocket which is active on the base body. A torsion spring is active between the spring loading insert and the toothed sector and is configured to constrain the spring loading insert and the toothed sector in rotation during controlled movements of the chain guide.

15 Claims, 4 Drawing Sheets

(51) Int. Cl.
  *B62M 9/126* (2010.01)
  *B62M 9/125* (2010.01)
  *B62M 9/121* (2010.01)
  *B62M 9/1246* (2010.01)
  *B62M 9/124* (2010.01)

(52) U.S. Cl.
  CPC .......... *B62M 9/126* (2013.01); *B62M 9/1246* (2013.01); *B62M 9/1248* (2013.01); *B62M 2009/12406* (2013.01)

(58) Field of Classification Search
  USPC ........................................................ 474/80
  See application file for complete search history.

(56) References Cited

U.S. PATENT DOCUMENTS

| | | | |
|---|---|---|---|
| 5,919,106 A | 7/1999 | Ichida | |
| 6,287,228 B1* | 9/2001 | Ichida | B62M 9/1248 474/80 |
| 6,290,621 B1* | 9/2001 | Ichida | B62M 9/1242 411/169 |
| 6,394,921 B1* | 5/2002 | Fukuda | B62M 9/126 474/80 |
| 7,090,603 B2 | 8/2006 | Shahana et al. | |
| 7,189,172 B2 | 3/2007 | Shahana et al. | |
| 7,572,199 B1* | 8/2009 | Calendrille, Jr. | B62M 9/125 474/80 |
| 7,585,237 B2 | 9/2009 | Fukuda | |
| 7,614,972 B2 | 11/2009 | Oseto | |
| 7,942,767 B2 | 5/2011 | Yamaguchi et al. | |
| 7,963,870 B2 | 6/2011 | Deguchi et al. | |
| 8,142,312 B2 | 3/2012 | Watarai | |
| 9,334,016 B2 | 5/2016 | Shahana et al. | |
| 2004/0110586 A1* | 6/2004 | Shahana | B62J 23/00 474/80 |
| 2006/0058135 A1* | 3/2006 | Shahana | B62M 9/125 474/82 |
| 2006/0105869 A1* | 5/2006 | Fukuda | B62M 9/125 474/80 |
| 2006/0194660 A1* | 8/2006 | Shahana | B62M 9/12 474/82 |
| 2007/0026985 A1* | 2/2007 | Yamaguchi | B62M 9/1242 474/82 |
| 2008/0026890 A1* | 1/2008 | Oseto | B62M 9/1242 474/82 |
| 2008/0026891 A1* | 1/2008 | Oseto | B62M 9/1242 474/82 |
| 2008/0051237 A1* | 2/2008 | Shahana | B62M 9/1244 474/82 |
| 2008/0064544 A1* | 3/2008 | Yamaguchi | B62M 9/125 474/80 |
| 2008/0081716 A1 | 4/2008 | Watarai et al. | |
| 2008/0125258 A1* | 5/2008 | Oseto | B62M 9/1244 474/80 |
| 2009/0098963 A1 | 4/2009 | Watarai | |
| 2009/0275429 A1* | 11/2009 | Deguchi | B62M 9/125 474/80 |
| 2014/0243129 A1* | 8/2014 | Pasqua | B62M 9/122 474/82 |
| 2014/0243130 A1* | 8/2014 | Pasqua | B62M 9/125 474/82 |
| 2015/0094177 A1* | 4/2015 | Emura | B62M 9/1242 474/80 |
| 2015/0148159 A1* | 5/2015 | Rosati | B62M 9/125 474/80 |

FOREIGN PATENT DOCUMENTS

| | | |
|---|---|---|
| EP | 1357023 A1 | 10/2003 |
| EP | 2769907 A1 | 8/2014 |

OTHER PUBLICATIONS

Chinese Office Action for Application 201711384250.X (dated Apr. 26, 2020).

\* cited by examiner

REAR DERAILLEUR OF A BICYCLE

CROSS REFERENCE TO RELATED APPLICATION

This application claims the benefit of Italian Patent Application No. 102016000128989, filed on Dec. 20, 2016, which is incorporated herein by reference as if fully set forth.

FIELD OF INVENTION

The present invention relates to a rear derailleur of a bicycle, in particular of the type with improved precision of control.

BACKGROUND

The rear derailleur is a mechanical or electromechanical device that causes the transmission chain to move among different toothed wheels of the sprocket assembly, for this purpose moving a chain guide in which the chain is engaged.

Normally, the rear derailleur comprises a four-bar linkage (typically an articulated parallelogram) with a base body and a movable body opposite the base body in the four-bar linkage, connected together through a pair of connecting rods hinged to such bodies according to four pin axes through four pin elements, wherein the base body is fixed to the frame of the bicycle and the movable body is fixed to a chain guide.

The deformation of the four-bar linkage determines a movement of the chain guide with respect to the frame in the axial direction with respect to the sprocket assembly and, in this way, gearshifting.

The deformation of the four-bar linkage can be obtained with manual actuation, through the movement of control levers and the transmission thereof to the four-bar linkage through a Bowden cable, or with motorized actuation, thanks to an electric motor that, following a suitable control imparted by the cyclist and through a suitable mechanism, moves mutually different parts of the four-bar linkage, deforming it and moving the chain guide.

Bicycle gearshifts having motorized actuation are described for example in EP1357023; in them, the linkage acts by moving opposite pins of the four-bar linkage apart from or towards one another.

In order to obtain precision of control of rear derailleurs, an initial adjustment of the bicycle is carried out with the purpose of optimizing the tension of the chain depending on the configuration and structure of the frame and of the sprocket assembly associated with the rear wheel.

Such an adjustment has the further purpose of bringing the chain guide towards the toothed wheels of the sprocket assembly.

Indeed, a reduced distance between the chain guide and the toothed wheels determines a greater sensitivity of control since, in such conditions, the movement component of the chain guide parallel to the axis of the sprocket assembly corresponds to an inclination exerted on the chain sufficient to trigger a movement from one sprocket to the other.

The elevation of the chain guide towards the toothed wheels is however limited by the sprocket having the largest diameter, since even with a configuration closest to the toothed wheel having the largest diameter there is still a substantial vertical distance between the chain guide and the toothed wheels having a smaller diameter.

In order to overcome this drawback, the Applicant has proposed a rear derailleur with improved precision of control in which the angular position of the base body changes with respect to the frame during the controlled deformation of the four-bar linkage.

Document EP2769907A1 to the same Applicant proposes a linkage for changing the angular position of the base body with respect to the frame that acts so as to rotate the base body in the counter-clockwise direction with respect to the frame of the bicycle when the chain guide is driven towards the largest toothed wheel or, vice-versa, to rotate the base body in the clockwise direction when the chain guide is driven towards the smallest toothed wheel.

In accordance with the teachings of EP2769907A1, a pin body connects the base body to the frame of the bicycle. The linkage for changing the angular position between the base body and the frame comprises a rotatable toothed sector connected to the pin body so that a rotation of the rotatable body determines a relative rotation between the pin body and the base body. A sprocket engaged with the toothed sector, driven in rotation by the actuation means of the gearshift, transfers a controlled rotation to the toothed sector.

The pin body comprises a closing screw adapted for passing through an axially outer opening of the base body and equipped with an enlarged head to abut, in an outer position with respect to the base body, the edge of the opening of the base body.

A cylindrical bush of the pin body is screwed to the frame of the bicycle and receives the closing screw in engagement. The cylindrical bush and the closing screw are screwed into one another to hold the base body in the axial direction, where rotational sliding means are arranged between the base body and the closing screw.

The closing screw thus makes it possible, when screwed into the cylindrical bush, to close the upper opening of the base body and at the same time to axially hold the assembly made up of base body, pin body and toothed sector.

The Applicant has noted that the rear derailleur with improved precision of control summarily described above requires, even more than conventional rear derailleurs (i.e. not equipped with linkage for changing the angular position of the base body with respect to the frame), special precautions to prevent dust, water, mud or dirt from filtering between the closing screw and the upper opening of the base body.

The Applicant has indeed found that the toothed sector and the engagement sprocket of the linkage for changing the angular position of the base body, both contained in the base body, are particularly negatively affected by possible presence of dust, water or dirt.

The Applicant has realized that it would be advantageous to eliminate the upper opening of the base body, so eliminating possible infiltrations, by providing a base body with blind inner cavity, as for example illustrated in document U.S. Pat. No. 7,963,870B2.

The Applicant has, however, found that the adoption of a blind base body in a rear derailleur structure with linkage for changing the angular position of the base body with respect to the frame (of the type for example described in document EP2769907A1) would not allow the pin body to be constrained to the frame, to the toothed sector and to the base body.

SUMMARY

The present solution provides a rear derailleur of a bicycle comprising:

a four-bar linkage having a base body and a movable body and a pair of connecting rods articulated to the base body and to the movable body along articulation axes at four pin elements;

the movable body being connected to a chain guide at a connection pin;

a fixing pin received in a blind inner cavity of the base body and comprising a fixing screw directly or indirectly constrained to the frame of the bicycle and a spring loading insert arranged in said blind inner cavity, the base body being rotatable with respect to said spring loading insert;

connection members inserted in seats formed on the fixing screw and said spring loading insert to axially constrain the fixing screw and spring loading insert;

a toothed sector and a sprocket, parts of an adaptation linkage configured to change the relative angular position between the base body and frame as a function of a controlled movement of the chain guide, the toothed sector being mounted coaxially to the spring loading insert and being active on the sprocket, the sprocket being directly or indirectly active on the base body;

a torsion spring active between the spring loading insert and toothed sector configured to constrain the spring loading insert and toothed sector in rotation during controlled movements of the chain guide.

BRIEF DESCRIPTION OF THE DRAWINGS

Further features and advantages of the present invention will become clearer from the following detailed description of some preferred embodiments thereof, made with reference to the attached drawings.

In the drawings.

DETAILED DESCRIPTION OF THE PREFERRED EMBODIMENTS

Figure 2:
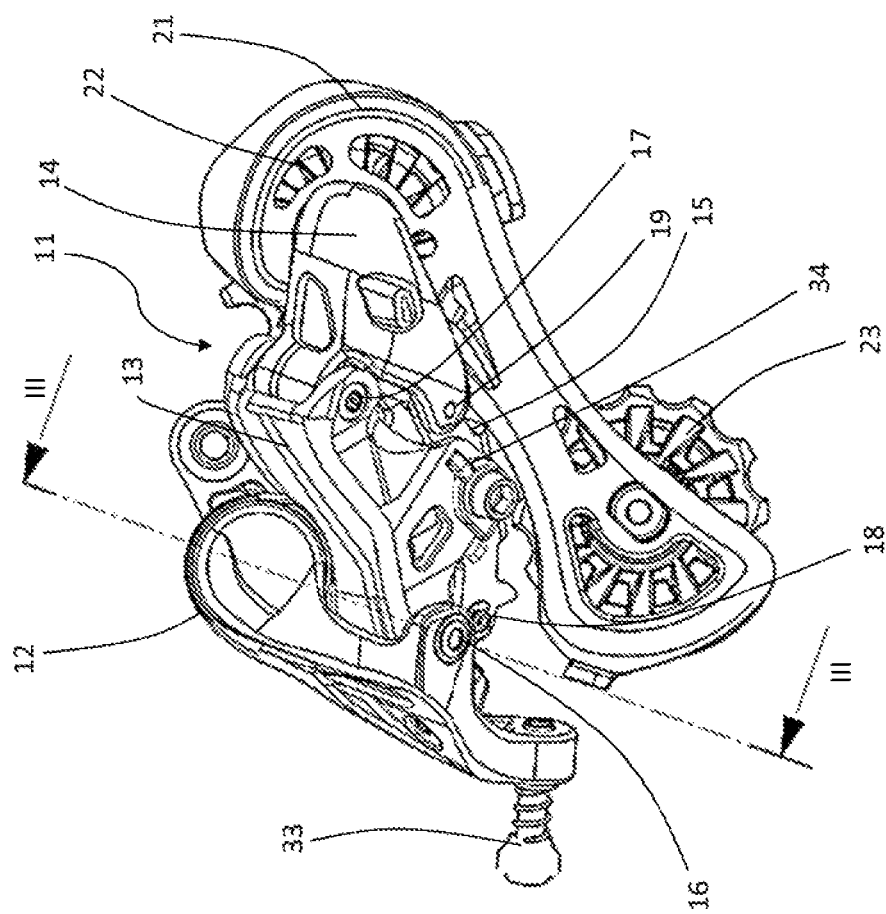
FIG. 2 shows the derailleur of FIG. 1 in a perspective view.

A rear derailleur of a bicycle is disclosed herein. The rear derailleur includes:

a four-bar linkage having a base body and a movable body and a pair of connecting rods articulated to the base body and to the movable body along articulation axes at four pin elements;

said movable body being connected to a chain guide at a connection pin;

a fixing pin received in a blind inner cavity of the base body and comprising a fixing screw directly or indirectly constrained to the frame of the bicycle and a spring loading insert arranged in said blind inner cavity, said base body being rotatable with respect to said spring loading insert;

connection members inserted in seats formed on said fixing screw and said spring loading insert to axially constrain said fixing screw and said spring loading insert;

a toothed sector and a sprocket, parts of an adaptation linkage configured to change the relative angular position between said base body and said frame as a function of a controlled movement of the chain guide, said toothed sector being mounted coaxially to the spring loading insert and being active on said sprocket, said sprocket being directly or indirectly active on the base body;

a torsion spring active between said spring loading insert and said toothed sector configured to constrain said spring loading insert and said toothed sector in rotation during controlled movements of the chain guide.

The controlled movements of the chain guide are given by deformations of the four-bar linkage determined by the action of the cyclist on the control of the derailleur. Such controlled movements make it possible to translate the chain guide in the axial direction and thus to derail the transmission chain onto different toothed wheels of the sprocket assembly.

The Applicant has perceived that by connecting the fixing screw to the spring loading insert with dedicated connection members which are not directly integrated in the interface between fixing screw and spring loading insert and by connecting the spring loading insert and the toothed sector with the torsion spring, it is possible to use a blind base body without giving up the linkage for changing the angular position of the base body or compromising the functionality thereof.

Indeed, during the controlled movements of the chain guide the spring loading insert and the toothed sector rotate as a unit with each other through the torsion spring, and, in particular, are fixed with respect to the frame.

This allows the toothed sector to set the sprocket of the adaptation linkage in rotation when a controlled movement of the chain guide is carried out. The rotation of the sprocket sets the base body in rotation with respect to the toothed sector carrying out an angular movement of the base body with respect to the frame.

The connection members of the fixing screw to the spring loading insert make the connection between these two elements independent from the axial connection of the base body to the fixing pin.

In this way, the base body does not need to be passed through by any screw that connects it to the fixing pin and that makes the two components of the fixing body integral with each other. The base body can thus be blind, in other words closed on top, and receive the fixing pin in its own blind inner cavity.

The axis about which the base body rotates is the main reference axial for the elements that form part of the derailleur of the present invention; all of the indications of direction and similar, such as "axial", "radial", "circumferential", "diametral" will be with reference to it; equally, the indications "towards the outside" and "towards the inside" referring to radial directions must be taken as away from the axis or towards the axis. The axial direction is parallel to the direction of development of the sprocket assembly of a bicycle, which coincides with the rotation axis of the hub of the rear wheel.

The rear derailleur of the present invention can comprise one or more of the following preferred features, taken individually or in combination.

Preferably, an adjustment insert, coaxial and radially outer with respect to the spring loading insert, is constrained directly or indirectly to the frame for rotations about an axial axis and is constrained axially and rotationally to the spring loading insert; said adjustment insert comprising adjustment members for adjusting its angular position with respect to the frame.

In this way, it is possible to adjust the initial position of the base body, and thus of the entire four-bar linkage, with respect to the frame of the bicycle.

Preferably, said spring loading insert is coaxial to said fixing screw and radially outer with respect to it; said connection members further axially constraining said spring loading insert to said adjustment insert.

This allows to axially constrain the fixing screw, the spring loading insert and the adjustment insert to one another independently from the axial constraint between the base body and the fixing pin.

Furthermore, by constraining the fixing screw, the spring loading insert and the adjustment insert with the same connection members the mounting operations of the derailleur are simplified.

Preferably, said fixing screw comprises a radially outer annular groove and said spring loading insert comprises holes that pass through it in a direction perpendicular to the axial direction; said connection members comprise a pair of pins inserted in said holes of the spring loading insert and interfering with said radial groove of the fixing screw.

In this way, the pair of pins prevents axial movements of the spring loading insert with respect to the fixing screw, whilst still allowing the rotation of the spring loading insert with respect to the fixing screw.

The toothed sector, being engaged on the sprocket is not capable of rotating with respect to the fixing pin during the mounting operations, since the sprocket can only rotate during controlled deformations of the four-bar linkage. The possibility of rotating the spring loading insert with respect to the fixing screw, and thus with respect to the toothed sector, during mounting promotes the insertion of the torsion spring with preload between spring loading insert and toothed sector.

Preferably, said adjustment insert comprises through holes that pass through it in a direction perpendicular to the axial direction; said pins also passing through said through holes of the adjustment insert.

In this way, when the pins are inserted in the adjustment insert, they make the adjustment insert and the spring loading insert axially integral.

When the adjustment insert is made to rotate as a unit with the frame, the spring loading insert also rotates as a unit with the frame.

In this way, the entire fixing pin remains both axially and rotatably integral with the frame of the bicycle.

Preferably, said adjustment insert further comprises threaded seats aligned with said through holes; said pins comprising respective threaded ends to screw into said threaded seats of the adjustment insert.

In this way, the pins of the connection members remain stable in the operative position without the possibility of them coming out during the normal use of the derailleur.

Preferably, said spring loading insert comprises a radial projection angularly delimited by a first and a second shoulder; said radial projection being inserted in a radial seat of the toothed sector angularly delimited by a first and a second abutment; said radial seat having an angular size greater than the angular size of the radial projection.

This allows, during mounting, to rotate the spring loading insert with respect to the toothed sector to place the torsion spring in position between the spring loading insert and the toothed sector by preloacling the spring itself.

Furthermore, such a coupling between the spring loading insert and the toothed sector allows the torsion spring to deform in the case of accidental knocks of the four-bar linkage or of anomalous tensioning of the transmission chain.

In the case of accidental knocks of the four-bar linkage or anomalous tensions of the transmission chain, forces are transmitted to the derailleur that have components such as to generate a pair of forces around the fixing pin.

The Applicant has noted that such a pair of forces would be entirely compensated by the constraint offered by the interface between the toothed sector and the sprocket, since these two components are the only interface between the fixing pin and the four-bar linkage.

The Applicant has realized that the toothed sector and the sprocket could mechanically yield when subjected to such stresses.

The torsion spring, in these cases, deforms making the toothed sector rotatable with respect to the fixing pin, thus compensating at least part of the force of the knock with its own elastic deformation.

Preferably, said torsion spring holds said first shoulder of the projection of the spring loading insert in abutment against said first abutment of the toothed sector.

In this way, when the derailleur is normally used, the torsion spring, through its preload, makes the spring loading insert and the toothed sector integral.

Preferably, said spring loading insert comprises a head portion having a shaped hole configured to receive a torsion key.

This allows rotation of the spring loading insert with respect to the toothed sector in opposition to the preload of the spring during the mounting operations of the derailleur.

Preferably, said spring loading insert comprises a head portion, contained in said inner cavity of the base body, configured to act as an abutment for said base body for translations in the axial direction and towards said frame.

In this way, the base body cannot translate axially towards the frame.

Preferably, a closure body is coaxially inserted on said fixing pin, rotatable with respect to the fixing pin and constrained to said base body; said closure body defining a closure wall for said inner cavity of the base body.

In this way, the blind inner cavity of the base body is closed also on the side facing towards the frame preventing dirt, mud or water from entering into the blind inner cavity and reach the toothed sector.

Preferably, said closure body is axially abutted, for axial translations towards said head portion of the spring loading insert, by a sealing element axially constrained to said fixing pin.

In this way, axial translations of the base body in a direction opposite to the frame are also prevented, allowing an axial constraint of the base body with respect to the frame (and with respect to the fixing pin).

Preferably, a transmission element is rigidly constrainable to the frame of the bicycle and comprises a threaded hole for receiving said fixing screw in engagement.

The transmission element allows mounting of the rear derailleur in a preselected position with respect to the frame irrespective of the exact position on the frame intended for receiving the fixing pin of the rear derailleur in engagement.

With reference to the figures, a rear derailleur of a bicycle is shown, wholly indicated with 10.

The rear derailleur 10 is adapted for moving a transmission chain (not illustrated) among a plurality of sprockets 100 associated with a rear wheel of the frame 200 of a bicycle. The sprockets 100 are of mutually different sizes (as illustrated in FIG. 1) and are aligned along an axial direction.

The rear derailleur 10 comprises a four-bar linkage 11 with a base body 12 and a movable body 14 connected together through a pair of connecting rods 13, 15, a front connecting rod of which 13 is articulated to the base body 12 at a first pin axis through a first pin element 16 and to the movable body 14 at a second pin axis through a second pin element 17, whereas a rear connecting rod 15 is articulated to the base body 12 at a third pin axis through a third pin element 18 and to the movable body 14 at a fourth pin axis through a fourth pin element 19 (FIG. 2).

Figure 1:
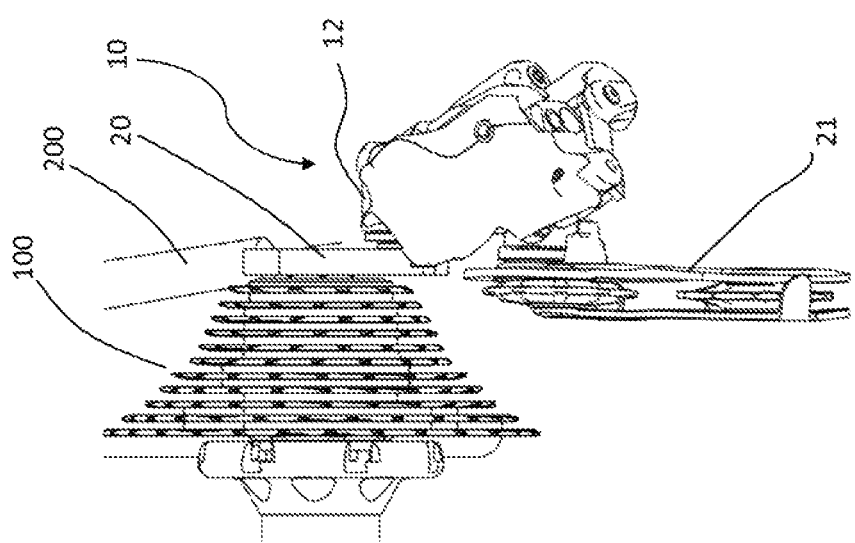
FIG. 1 is a schematic view of a rear derailleur according to the present invention in usage configuration.

The base body 12 is intended to be fixed to the frame 200 of the bicycle, as shown in FIG. 1.

In the preferred embodiment of the invention, the base body 12 is fixed to a joint element 20 which, in turn, is directly connected to the frame 200 of the bicycle.

The movable body 14, opposite the base body 12 in the four-bar linkage 11, is associated with a chain guide 21.

The chain guide 21 comprises an upper transmission wheel 22 and a lower transmission wheel 23 for the transmission chain.

Figure 4:
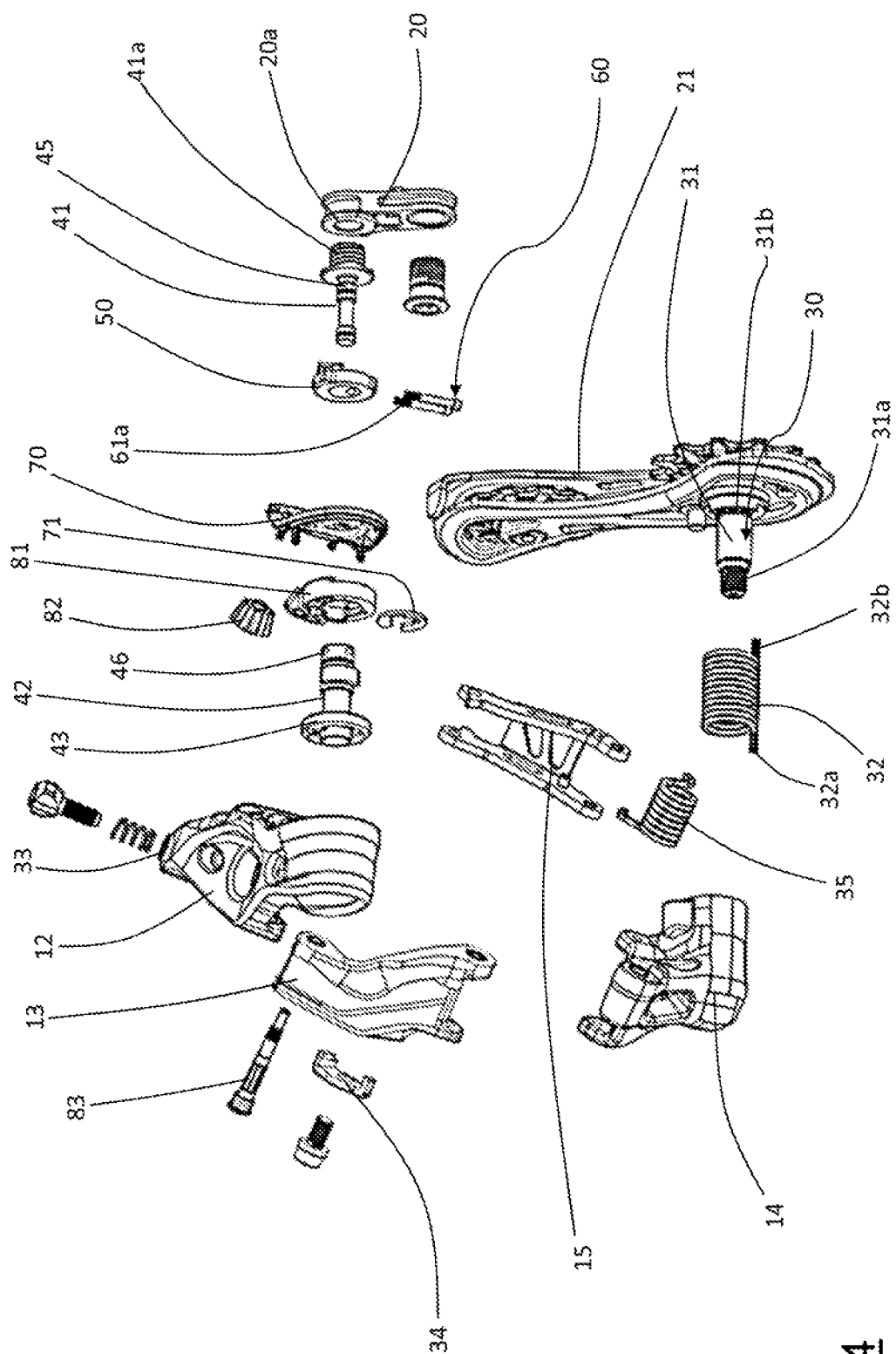
FIG. 4 is an exploded view of some components of the derailleur of FIG. 2.

The movable body 14 is rotatably coupled with the chain guide 21 about an axial direction. For this purpose, a connection pin 30 is provided (FIG. 4) that comprises a fifth pin element 31 provided, at a first end 31a, with a connection interface to the movable body 14 and connected, at a second end 31b, opposite the first, in an integral manner to the chain guide 21.

A chain tensioning spring 32 is mounted coaxial to the fifth pin element 31, said spring 32 acting on the transmission chain in order to determine a condition of equilibrium that defines the positions that can be assumed by the chain guide 21 with respect to the frame 200.

The chain tensioning spring 32 engages, at a first end 32a, with the connection interface to the movable body 14 in order to counteract/limit a relative rotation between the moveable body 14 and chain guide 21 and keep the transmission chain under tension.

At the second end 31b of the fifth pin element 31 there is a system for adjusting the preload of the chain tensioning spring 32.

Actuation means of the gearshift are also provided that are adapted for modifying the configuration of the four-bar linkage 11 so as to determine a relative movement between the movable body 14 and the base body 12 and, consequently, an axial movement of the chain guide 21 with respect to the frame 20.

The actuation means comprise at least one control lever (not illustrated) arranged in connection to the four-bar linkage 11 through a control cable of the Bowden type (not illustrated), i.e. comprising an outer sheath relative to which an inner cable core is free to slide.

The four-bar linkage 11 is provided with a sheath seat 33 for the support of the control cable and the fixing in position of the outer sheath thereof in order to allow the relative sliding between the inner core of the cable with respect to the outer sheath. The sheath seat 33 is integral with the base body 12.

There is also a fixing clamp 34 of the end of the core of the control cable arranged on the front connecting rod 13 so that the traction imposed by a relative movement between the sheath and the core of the cable determines a deformation of the four-bar linkage 11.

The traction action imposed by the relative movement between the sheath and the core of the cable is counteracted by a return spring 35 that, in the specific embodiments illustrated, is arranged at the fourth pin element 19.

For the coupling between the base body 12 and the frame 200, or preferably with the joint element 20, there is a fixing pin 40.

The fixing pin 40 comprises a fixing screw 41 having a first threaded end 41a to be able to be screwed into a threaded hole 20a of the joint element 20.

The fixing screw 41 emerges in the axial direction from the joint element 20.

The fixing pin 40 further comprises a spring loading insert 42 fitted onto the fixing screw 41 so as to be coaxial to it.

For this purpose, the spring loading insert 42 is internally hollow to radially surround the portion of fixing screw 41 emerging from the joint element 20.

The cavity of the spring loading insert 42 is not threaded, just as the portion of fixing screw 41 emerging from the joint element 20 for connecting to the frame 200 is not threaded.

The spring loading insert 42 comprises a head portion 43 arranged at a first end 42a of the spring loading insert itself that receives the upper blind end of the base body 12 in axial abutment, so that the base body 12 can rotate with respect to the spring loading insert 42 in mutually opposite angular directions. The axis R about which the base body 12 rotates with respect to the spring loading insert 42 is axially directed.

Figure 3:
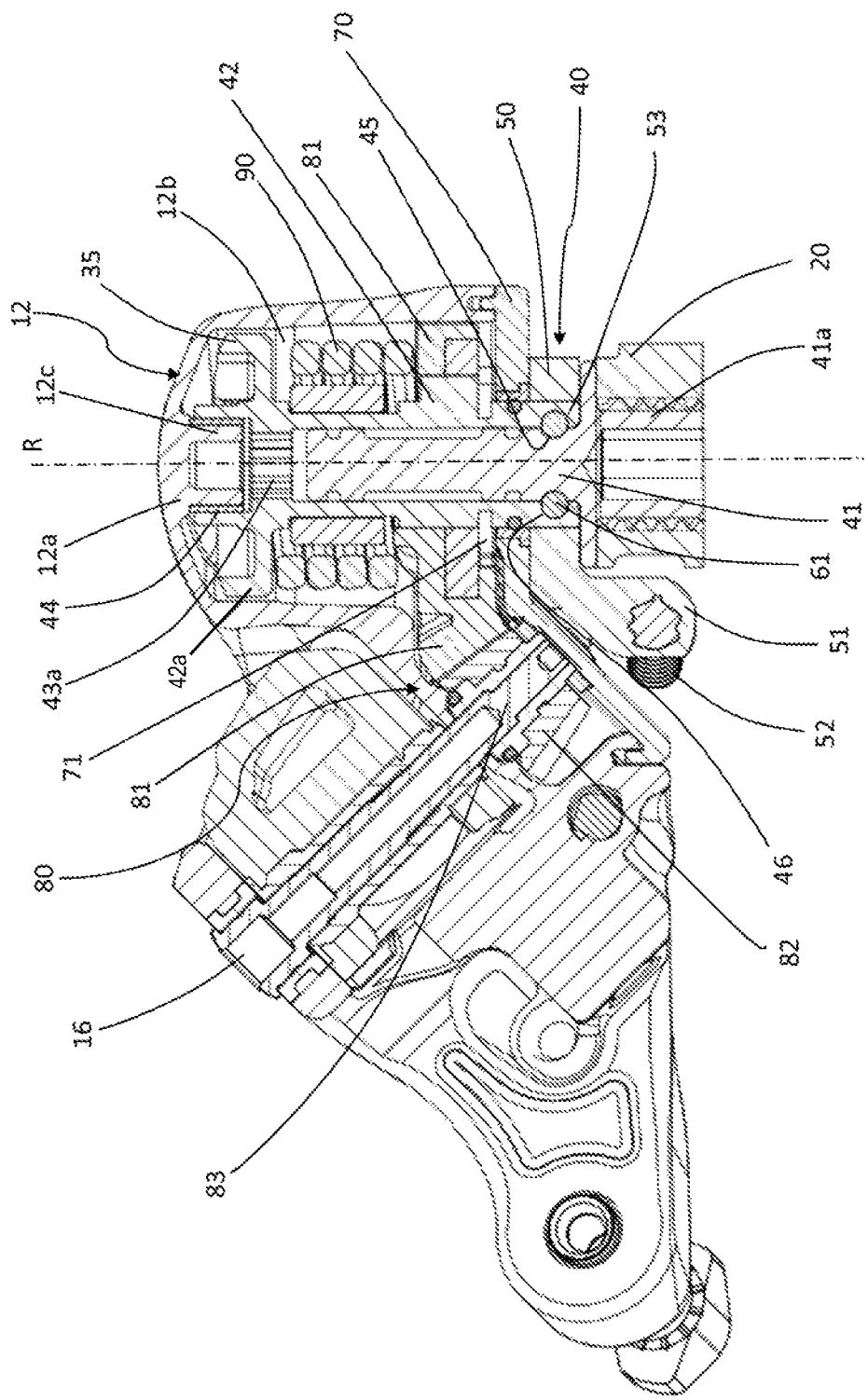
FIG. 3 is a section view along the axis III-III of the derailleur of FIG. 2.

As illustrated in FIG. 3, the base body 12 has axial abutment against the head portion 43 of the spring loading insert 12 at its own axial end portion 12a. Such an axial end portion 12a is blind, in other words it does not have through holes and defines an upper wall of an inner cavity 12b of the base body 12. In other words, the axial end portion 12a completely covers the head portion 43 of the spring loading insert 42.

The coupling between the head portion 43 of the spring loading insert 42 and the base body is obtained through a sleeve element 44, emerging axially from the head portion 43, which axially receives an axial protuberance 12c of the base body 12.

The diameter of the sleeve 44 is greater than the diameter of the axial protuberance 12c, so that the axial protuberance 12c is free to rotate about the rotation axis R inside the sleeve element 44. Such an axial protuberance 12c projects inside the inner cavity 12b of the base body 12, as illustrated in FIG. 3.

The fixing pin 40 is housed partially inside such an inner cavity 12b of the base body.

Outside of the spring loading insert 42 and close to an end thereof opposite the head portion 43 there is an adjustment insert 50 coaxial to the spring loading insert 42. The adjustment insert 50 has a substantially annular shape and has a stalk 51 able to abut on the frame 200, or, preferably, on the joint element 20. The stalk 51 makes the adjustment insert integral with the frame 200 both for movements in the axial direction and for rotations about the rotation axis R.

The angular position of the adjustment insert with respect to the frame 200 can be adjusted so as to adjust the position of the fixing pin 40 with respect to the frame 200.

For this purpose, there is an adjustment screw 52 that engages the stalk 51 radially and goes into abutment against a projection of the frame 200 or, preferably, of the joint element 20.

In order to axially constrain the spring loading insert 42 and the fixing screw 41 to one another, there are connection members 60 inserted between the fixing screw 41 and the spring loading insert 42.

The connection members 60 comprise a pair of pins 61 inserted, along directions parallel to each other and perpendicular to the rotation axis R, between the spring loading insert 42 and the fixing screw 41.

Concerning this, the fixing screw 41 comprises a radially outer annular groove 45 that extends circumferentially along the entire outer surface of the fixing screw 41.

The spring loading insert 42 comprises a pair of holes 46 that pass through it along directions parallel to each other and perpendicular to the rotation axis R. Such holes 46 are radially and axially arranged at the groove 45 of the fixing screw 41, in such a way that the holes 46 directly face the groove 45. The diameter of the pins 61 is substantially identical to the diameter of the holes 46, so that the pins can pass through the holes 46.

As illustrated in FIG. 3, when the pins 61 are inserted in the holes 46, the pins 61 intercept the groove 45 engaging it.

In this way, the pins 61 axially constrain the fixing screw 41 to the spring loading insert 42.

The adjustment insert 50 is also equipped with respective holes 53 that are parallel to each other and perpendicular to the rotation axis R. The holes 53 of the adjustment insert are aligned with the holes 46 of the spring loading insert 42 and are also passed through by the pins 61.

In this way, the pins 61 constrain the spring loading insert 42 to the frame 200 in rotation, since they prevent reciprocal rotations between the adjustment insert (integral with the frame 200) and the spring loading insert 42.

In order to ensure that the pins 61 remain in the position described above, they comprise a respective threaded end portion 61a that is screwed into the threaded end of the adjustment insert 50 and aligned with the aforementioned holes 53.

By adjusting the angular position of the adjustment insert 50 with respect to the frame 200, the fixing pin 40, and in particular the spring loading insert 42, copies the angular position reached by the adjustment insert 50.

In order to axially constrain the base body 12 to the fixing pin 40 there is a closure body 70 coaxially inserted on the fixing pin 40 and rotatable with respect to it.

The closure body 70 is prevented from translating in the axial direction towards the head portion 43 of the spring loading insert 42 by an axial sealing element 71 fitted onto the outer surface of the spring loading insert 42 and contained in the inner cavity 12b of the closure body (FIG. 3).

Such a sealing element 71 is, for example, a Seeger inserted in a circumferential and radially outer groove formed on the spring loading insert 42.

The closure body 70 is constrained to the base body 12 through screws or through teeth that interfere mechanically in suitable seats.

The base body 12 is free to rotate with respect to the frame and is axially held on it by the coupling with the head portion 43 of the spring loading insert 42 and by the closure body 70. The fixing pin 40 is both axially and rotatably constrained to the frame 200, and therefore the base body 12 is rotatable about the rotation axis R with respect to the fixing pin 40.

The derailleur 10 further comprises a linkage 80 for adapting the relative position between the base body 12 and the frame 200 as a function of a controlled movement of the chain guide 21, so as to determine a change in the configuration of the chain guide 21.

The linkage 80 comprises a toothed sector 81 and sprocket 82 engaged on the toothed sector 81 (FIG. 3).

The sprocket 82 is mounted integrally on a pin element 83 to which a controlled rotation is imparted that at the same time determines a movement of the chain guide 21.

Concerning this, the pin element 83 is made integral or coincides with the first pin element 16 arranged between the front connecting rod 13 and the base body 12.

A fixing plate 83a is rotatably coupled with the pin element 83 at the sprocket 82 so as to prevent flexing of the pin element 83.

Figure 6:
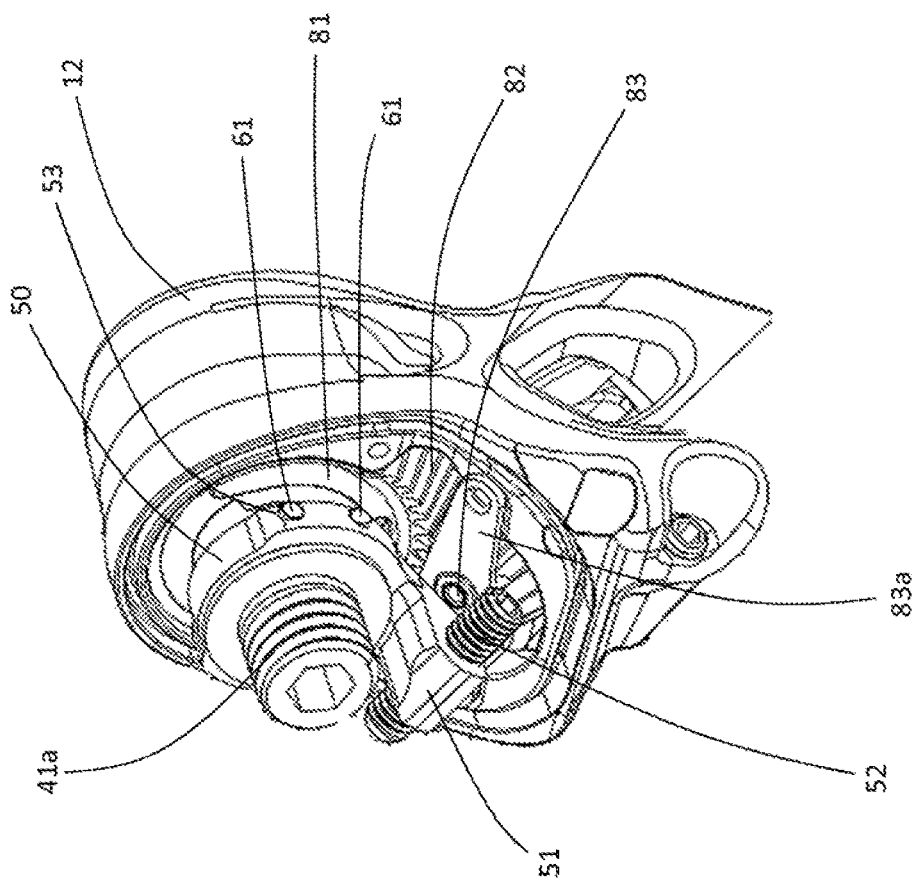
FIG. 6 is a further perspective view of the derailleur of FIG. 2 with some parts removed to better highlight others.

The fixing plate 83a rotatably receives an end of the pin element 83 in engagement and is constrained (for example by screws) to the base body 12, as illustrated in FIG. 6.

The rotation of the front connecting rod 13 with respect to the base body 12, carried out during a controlled movement of the chain guide 21, determines the rotation of the pin element 83 and thus of the sprocket 82.

The toothed sector 81 is mounted coaxially to the spring loading insert 42 and is axially arranged between the head portion 43 of the spring loading insert and the closure body 70.

The toothed sector 81 is axially held by the axial sealing element 71, so as not to be able to translate axially towards the first end 41a of the fixing screw 41.

The toothed sector 81 is completely contained in the inner cavity 12b of the base body 12, as schematized in FIG. 3.

Between the head portion 43 of the spring loading insert 42 and the toothed sector 81 there is a torsion spring 90 which acts with a preload between these two elements. The torsion spring 90 comprises a pair of stalks (not illustrated) projecting axially from opposite ends of the torsion spring 90 in which a first stalk is inserted in an axial hole (not illustrated) formed in the head portion 43 of the spring loading insert 42 and a second stalk is inserted in an axial hole in the toothed sector 81.

The torsion spring 90, through the preload in mounting step, constrains the toothed sector 81 to the spring loading insert 42 and, therefore, the toothed sector 81 to the fixing pin 40 in rotation.

Such rotational constraint is active for rotational forces transmitted to the toothed sector 81 during any controlled movement of the chain guide 21.

During such controlled movements, as stated, the four-bar linkage 11 deforms and, in particular, the front connecting rod 13 rotates with respect to the base body 12. Such a rotation causes the rotation of the pin element 83 and of the sprocket 82 which is engaged on the toothed sector 81.

The toothed sector 81, being constrained in rotation to the fixing pin 40 (which in turn is constrained in rotation to the frame 200), causes the rotation of the sprocket 82 about the toothed sector 81 itself.

This rotation determines a corresponding rotation of the base body 12 about the rotation axis R, since the pin element 83 is rigidly connected to the sprocket 82 and is arranged at the first pin element 16 that connects the front connecting rod 13 to the base body 12.

Therefore, every controlled movement of the chain guide 21 in the axial direction (which positions the chain guide at a new toothed wheel of the sprocket assembly) corresponds to a rotation of the base body 12 about the rotation axis R (directed in the axial direction) that determines a vertical movement (in other words in a direction perpendicular to the axial direction) of the chain guide 21 away from or towards the sprocket assembly.

The torsion spring 90, as well as making the toothed sector 81 integral with the fixing pin 40 during controlled rotations of the chain guide 21, makes it possible to rotate the base body 12 and the inner four-bar linkage 11 in the case of accidental knocks of the four-bar linkage 11 or of anomalous tractions of the transmission chain of the bicycle.

In these cases, the rotational forces transmitted to the torsion spring 90 by the toothed sector 81 are greater in size than those transmitted to the torsion spring 90 during controlled movements of the chain guide.

The torsion spring 90, in these cases, deforms making the toothed sector 81 rotatable with respect to the head portion 43 of the spring loading insert 42 and thus with respect to the fixing pin 40.

A rotation of the toothed sector 81 with respect to the fixing pin 40 determines (through the interface of the toothed sector 81 with the sprocket 82) a rotation of the base body 12 and of the entire four-bar linkage 11 with respect to the fixing pin 40 and, therefore, with respect to the frame 200, at least partially transferring the energy of the knock or of the anomalous tension of the transmission chain to the torsion spring 90 (which deforms).

In the case of particularly violent knocks, the rotation of the base body 12 is such as to take the four-bar linkage in contact with the frame 200 of the bicycle ensuring that the energy of the knock is dissipated not only by the deformation of the torsion spring 90 but also by the knock of the four-bar linkage 11 against the frame 200. By providing mounting geometries and distances such as to ensure that it is a particularly strong portion of the four-bar linkage that knocks the frame, it is possible to avoid damage to the derailleur 10.

Concerning this, the torsion spring 90 yields for rotations of the toothed sector 81 with respect to the fixing pin 40 along a counter-clockwise angular direction (for anyone observing the derailleur front the front in operating configuration).

Figure 5:
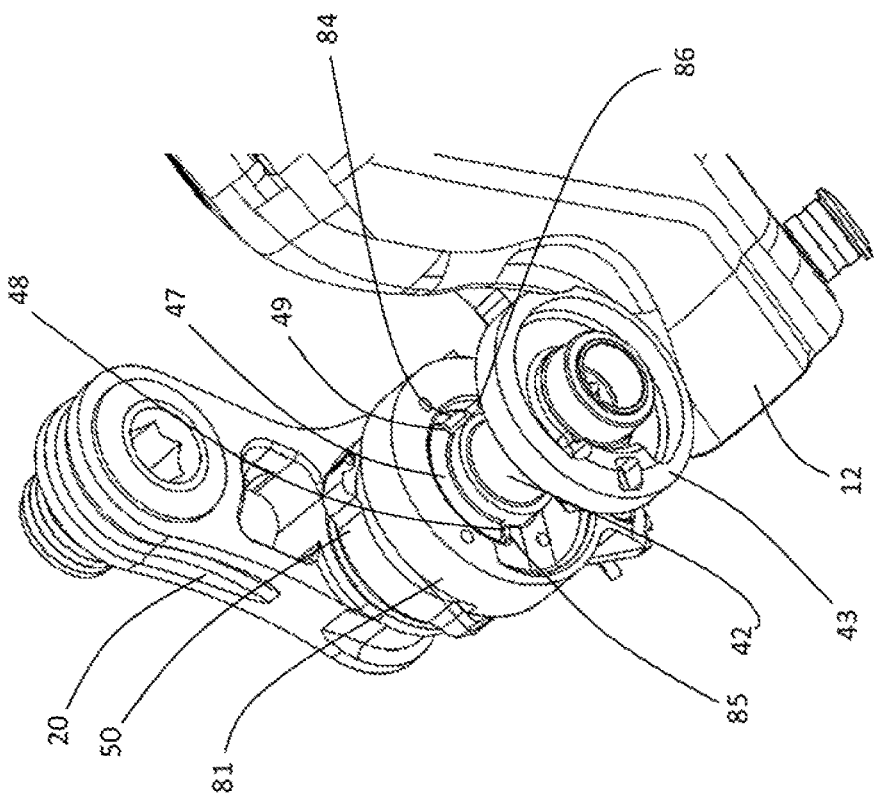
FIG. 5 is a perspective view of the derailleur of FIG. 2 with some parts removed to better highlight others.

In order to allow the toothed sector 81 to rotate with respect to the spring loading insert 42 in the aforementioned conditions, the spring loading insert 42 comprises a radial projection 47 (FIG. 5). The radial projection 47 has an angular extension delimited by a first 48 and a second 49 shoulder. The radial projection 47 is arranged going axially away from the head portion 43 of the spring loading insert 42.

The toothed sector 81 comprises a radial seat 84 angularly delimited by a first 85 and a second abutment 86 for the shoulders 48, 49.

The radial projection 47 is inserted in the radial seat 84.

The angular distance that separates the first 48 from the second shoulder 49 is less than the angular distance that separates the first 85 from the second abutment 86, so that the radial seat 84 can complete an angular rotation with respect to the radial projection 47 of size equal to the difference between the radial distances between the abutments 85, 86 and the shoulders 48, 49.

The torsion spring 90 exerts its own preloading action so that the first shoulder 48 is held against the first abutment 85.

The rotation of the radial seat 47 takes place in opposition to the torsion spring 90 and proceeds until the second abutment 86 makes contact against the second shoulder 49 (or until the four-bar linkage knocks the frame), allowing the base body 12 to rotate with respect to the frame 200.

In order to allow the radial projection 47 to be inserted in the radial seat 84 (preloading the torsion spring 90) in mounting step of the derailleur 10, the head portion 43 of the spring loading insert 42 has a shaped hole 43a configured to receive a torsion key (FIG. 3).

The rear derailleur can undergo numerous modifications and variants, like for example means for deforming the four-bar linkage of the electro-mechanical type instead of the completely mechanical ones described, all of which are encompassed by the scope of protection of the attached claims.

What is claimed is:

1. A rear derailleur of a bicycle comprising:
    a four-bar linkage having a base body and a movable body and a pair of connecting rods articulated to the base body and to the movable body along articulation axes at four pin elements;
    said movable body being connected to a chain guide at a connection pin;
    a fixing pin received in an inner cavity that is formed by one closed end of the base body and comprising a fixing screw directly or indirectly constrained to a frame of the bicycle and a spring loading insert arranged in said blind inner cavity, said base body being rotatable with respect to said spring loading insert;
    connection members inserted in seats formed on said fixing screw and said spring loading insert to axially constrain said fixing screw and said spring loading insert to each other;
    a toothed sector and a sprocket parts of an adaptation linkage configured to change a relative angular position between said base body and said frame as a function of a controlled movement of the chain guide, said toothed sector being mounted coaxially to the spring loading insert and being active on said sprocket, said sprocket being directly or indirectly active on the base body; and
    a torsion spring active between said spring loading insert and said toothed sector configured to constrain said spring loading insert and said toothed sector in rotation during controlled movements of the chain guide.

2. The rear derailleur according to claim 1, further comprising an adjustment insert, coaxial and radially outer with respect to the spring loading insert, directly or indirectly constrained to the frame for rotations about an axial axis (R) and axially and rotationally constrained to the spring loading insert; said adjustment insert comprising adjustment members to adjust an angular position of said adjustment insert with respect to the frame.

3. The rear derailleur according to claim 2, wherein said spring loading insert is coaxial to said fixing screw and radially outer with respect to said fixing screw; said connection members further axially constraining said spring loading insert to said adjustment insert.

4. The rear derailleur according to claim 3 wherein said adjustment insert comprises through holes that pass through said adjustment insert in a direction perpendicular to an axial direction; said connection members comprise a pair of pins passing through said through holes of the adjustment insert.

5. The rear derailleur according to claim 4, wherein said adjustment insert further comprises threaded seats aligned with said through holes; said pair of pins comprising respective threaded ends for screwing into said threaded seats of the adjustment insert.

6. The rear derailleur according to claim 4, wherein the seats formed on said fixing screw and said spring loading insert include:
    (i) a radially outer annular groove on the fixing screw, and
    (ii) holes that pass through the fixing screw in a direction perpendicular to an axial direction; and
        said pair of pins further inserted in said holes of the spring loading insert and interfering with said radially outer annular groove of the fixing screw.

7. The rear derailleur according to claim 1, wherein the seats formed on said fixing screw and said spring loading insert include:

(i) a radially outer annular groove on the fixing screw, and
(ii) holes on the spring loading insert that pass through the fixing screw in a direction perpendicular to an axial direction; and
said connection members comprise a pair of pins inserted in said holes of the spring loading insert and interfering with said radially outer annular groove of the fixing screw.

8. The rear derailleur according to claim 7, wherein the pair of pins are radially offset from a rotational axis of the base body.

9. The rear derailleur according to claim 1, wherein said spring loading insert comprises a radial projection angularly delimited by a first and a second shoulder; said radial projection being inserted in a radial seat of the toothed sector angularly delimited by a first and a second abutment; said radial seat having an angular size greater than the angular size of the radial projection.

10. The rear derailleur according to claim 9, wherein said torsion spring holds said first shoulder of the radial projection of the spring loading insert in abutment against said first abutment of the toothed sector.

11. The rear derailleur according to claim 1, wherein said spring loading insert comprises a head portion equipped with a shaped hole configured to receive a torsion key.

12. The rear derailleur according to claim 1, wherein said spring loading insert comprises a head portion, contained in said inner cavity of the base body, configured to act as an abutment for said base body for translations in an axial direction and towards said frame.

13. The rear derailleur according to claim 12, further comprising a closure body coaxially inserted on said fixing pin, rotatable with respect to the fixing pin and constrained to said base body; said closure body defining a closure wall for said inner cavity of the base body.

14. The rear derailleur according to claim 13, wherein said closure body is axially abutted, for axial translations towards said head portion of the spring loading insert, by a sealing element axially constrained to said fixing pin.

15. The rear derailleur according to claim 1, further comprising a transmission element rigidly constrainable to the frame of the bicycle and comprising a threaded hole for receiving said fixing screw in engagement.

* * * * *

UNITED STATES PATENT AND TRADEMARK OFFICE
CERTIFICATE OF CORRECTION

PATENT NO. : 10,814,934 B2
APPLICATION NO. : 15/846667
DATED : October 27, 2020
INVENTOR(S) : Paolo Pasqua Page 1 of 1

It is certified that error appears in the above-identified patent and that said Letters Patent is hereby corrected as shown below:

In the Specification

At Column 5, Line 67, delete "preloacling" and insert --preloading--.

In the Claims

In Claim 1, at Column 12, Lines 15-16, delete "said blind inner cavity" and insert --said inner cavity--.

Signed and Sealed this
Sixteenth Day of February, 2021

Drew Hirshfeld
*Performing the Functions and Duties of the
Under Secretary of Commerce for Intellectual Property and
Director of the United States Patent and Trademark Office*